E. M. JOHANSEN.
METHOD OF TREATING OIL.
APPLICATION FILED MAY 9, 1919.

1,438,764.

Patented Dec. 12, 1922.
7 SHEETS—SHEET 1.

INVENTOR
Ernst M. Johansen
BY
Cornelius L. Ehret
ATTORNEY.

E. M. JOHANSEN.
METHOD OF TREATING OIL.
APPLICATION FILED MAY 9, 1919.

1,438,764.

Patented Dec. 12, 1922.
7 SHEETS—SHEET 2.

INVENTOR
Ernst M. Johansen
BY
Cornelius D. Ehret
ATTORNEY.

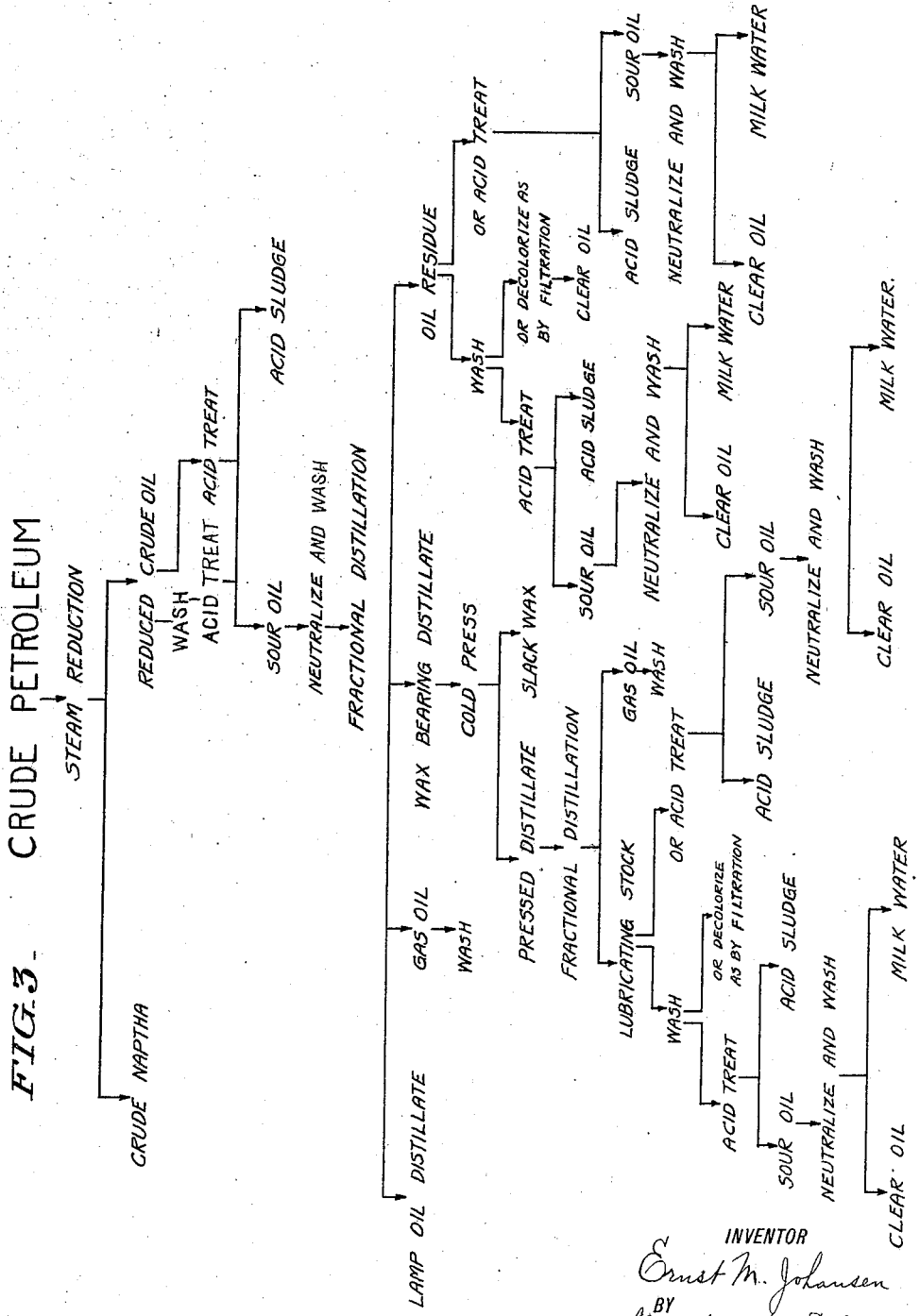

E. M. JOHANSEN.
METHOD OF TREATING OIL.
APPLICATION FILED MAY 9, 1919.
1,438,764.
Patented Dec. 12, 1922.
7 SHEETS—SHEET 4.
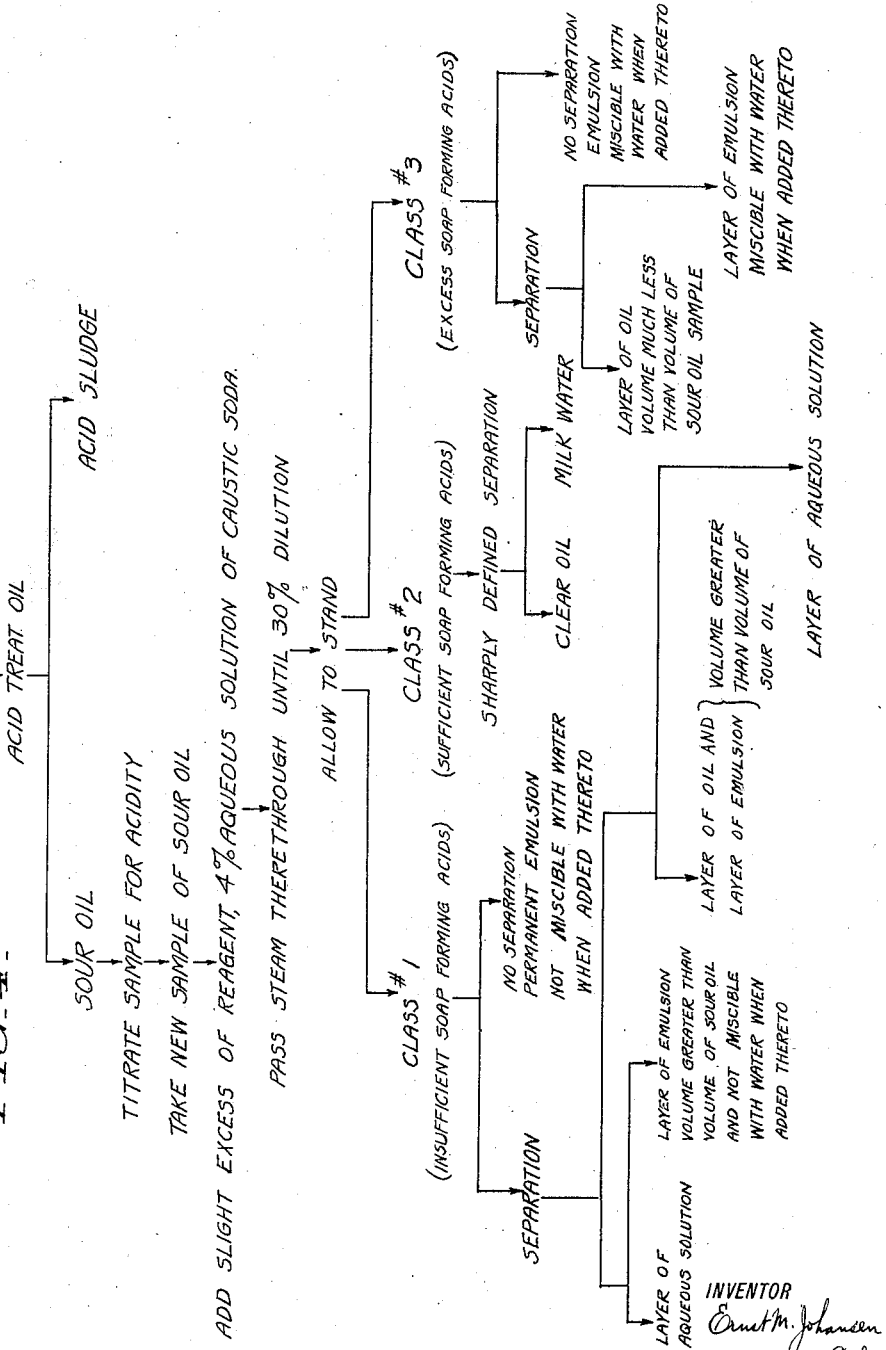

E. M. JOHANSEN.
METHOD OF TREATING OIL.
APPLICATION FILED MAY 9, 1919.
1,438,764.
Patented Dec. 12, 1922.
7 SHEETS—SHEET 5.
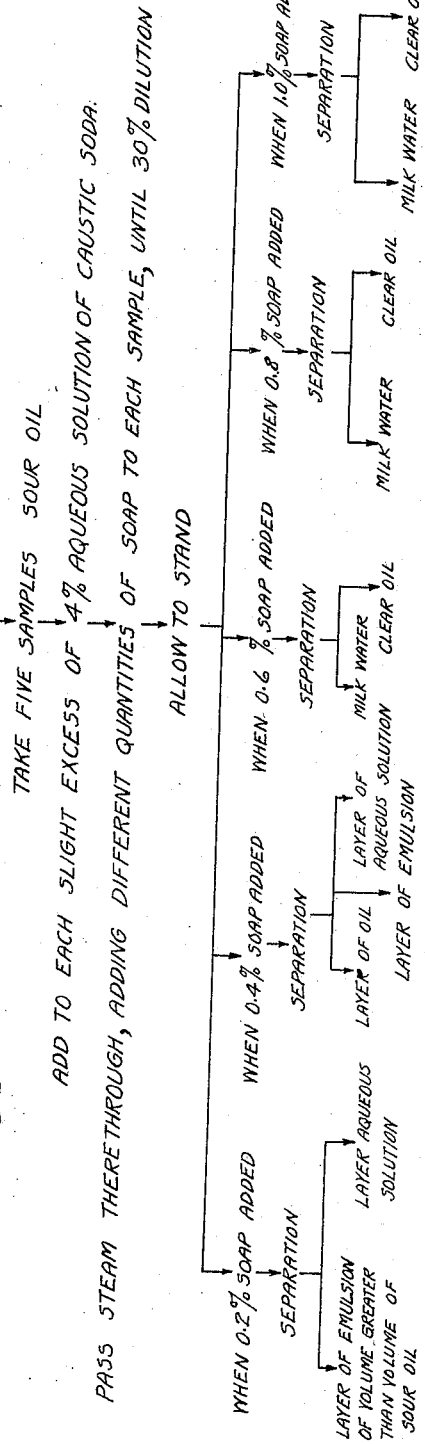
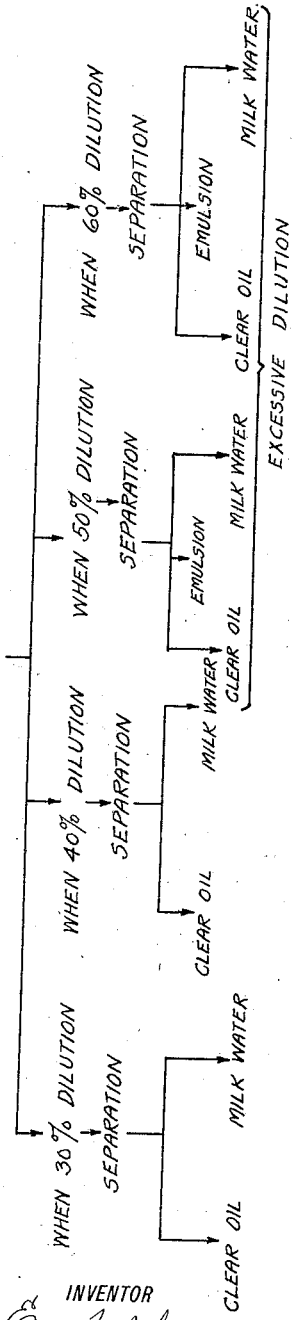
INVENTOR
Ernst M. Johansen
BY Cornelius L. Ehret
ATTORNEY.

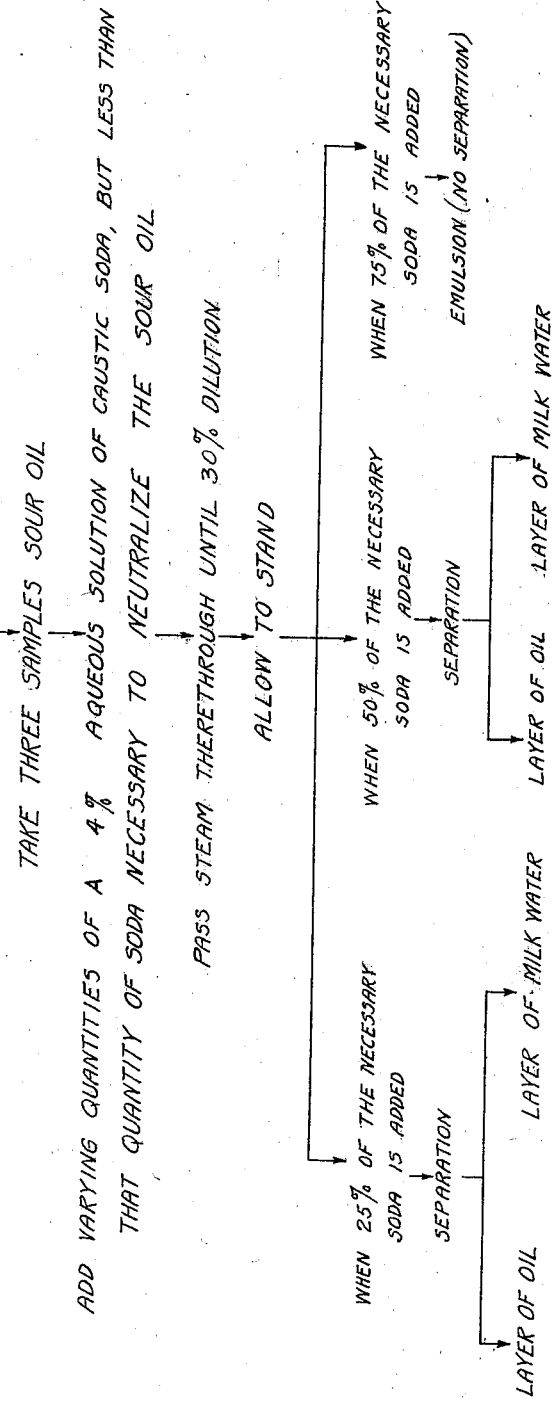

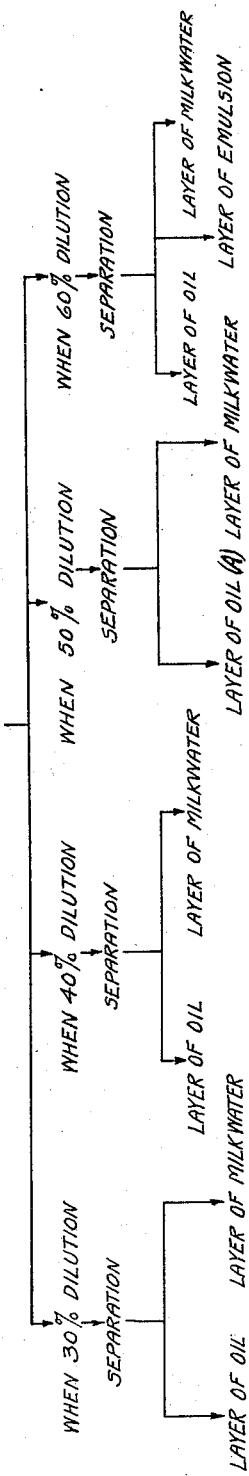

Patented Dec. 12, 1922.

1,438,764

UNITED STATES PATENT OFFICE.

ERNST M. JOHANSEN, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

METHOD OF TREATING OIL.

Application filed May 9, 1919. Serial No. 295,946.

*To all whom it may concern:*

Be it known that I, ERNST M. JOHANSEN, a citizen of the United States, residing in the city and county of Philadelphia, State of Pennsylvania, have invented certain new and useful Improvements in Methods of Treating Oil, of which the following is a specification.

My invention relates to the treatment of petroleum, shale oil or other mineral oils and oils derived from mineral deposits, as coal, for improving refinery processes and for procuring improved products.

My invention resides in a method of treating oils of the character referred to for removing therefrom solids in suspension or in colloidal state or form, or other materials, naturally existing in the oil or resulting from treatment thereof, which have interfered with refinery processes or whose presence, probably heretofore unrecognized, has entailed certain refinery processes in attaining certain products.

My invention resides more particularly in a method of treating oils of the character above referred to, and especially lubricating distillates or stocks, for rendering the same non-emulsifying or of a character withstanding the so-called steam test or other emulsification tests; for procuring a brighter or better light reflecting and transmitting oil; for improving color, removing odor and for procuring other effects.

My invention resides further in a method of treating oils of the character above referred to, and especially lubricating distillates or stocks, either before or after, or both before and after the acid treatment, such as treatment by strong sulphuric acid, with resultant advantages in the refining processes and in the products.

For an understanding of some of the various modes of procedure comprehended within my invention, reference may be had to the accompanying drawings, in which:

Figs. 1, 2 and 3 are charts of some of various modes of refining petroleum in connection with which my invention is available.

Fig. 4 is a chart of a possible mode of procedure in classifying oils.

Figs. 5 and 6 are, respectively, charts of possible modes of procedure for determining the quantity of soap and dilution of soap solution for washing a class 1 oil.

Figs. 7, 8 and 9 are, respectively, charts of possible modes of procedure in determining respecting a class 3 oil the quantity of alkali to be used in the first stage washing, dilusion of soap solution in first stage washing and the second stage treatment.

Figure 1:
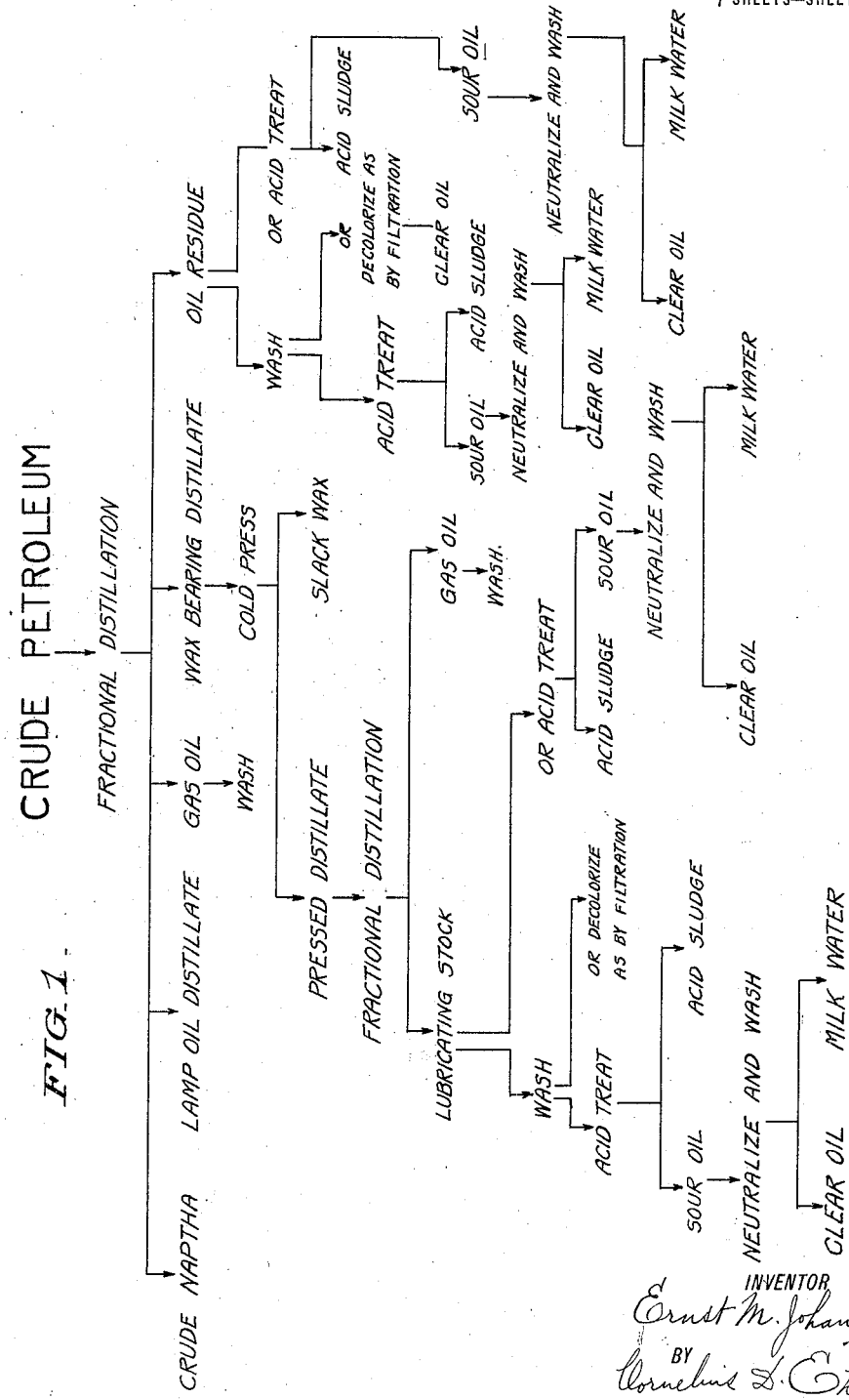

Respecting the cause of emulsification of oil of the character referred to with water, from theoretical considerations and from practice I am led to believe that permanent emulsions of the oil with water are due to the presence in the oil or water of solids in finely divided state in suspension, or solids in colloidal form or state, as distinguished from solids present in true solution, in which last case the solids do not induce emulsification. These solids to be removed probably include asphaltic bodies, polymerization products, mineral and other finely divided bodies. With such solids present in the oil or water when the oil and water are agitated to cause a fine subdivision of one, the dispersed phase, in the other, the continuous phase, if the solids referred to are adsorbed at the interface between the oil and water, and are present in the continuous phase, they strengthen the films of the continuous phase to such extent that they cannot be broken by the interfacial tension between the oil and water, and so a permanent emulsion will result. While the films of the continuous phase, as oil, between the particles of the dispersed phase, as water, are thus strengthened by the adsorbed solids, the interfacial tension is at the same time decreased by the presence of these solids and is accordingly unable to rupture the strengthened films of the continuous phase, so preventing coalescence and separation of the two liquids.

To render an oil having such solids therein non-emulsifying it is desirable to remove the emulsification-inducing solids therein, and this in accordance with one feature of my invention is brought about by causing transfer or migration of the solids from the oil into another liquid, as water, under the influence of suitable agent or agents, and then separating the oil from the water which then contains the solids.

To this end I employ a suitable liquid, as a solution of suitable soap in water, which has an interfacial tension towards the solids in the oil lower than the interfacial tension between the oil and the suspended or colloidal solids which are to be removed; or, otherwise stated, I employ a liquid which wets the solids more readily than does the oil in which they are present.

Removal of the solids from the oil to produce a non-emulsifying oil by the aid of another liquid, as a suitable solution in water, may best be carried out by causing the solution to become dispersed in the oil, since this is the condition under which the subsequent desired complete separation of the oil and treating liquid will most readily take place.

In accordance with my invention, therefore, I produce a non-emulsifying oil or otherwise beneficially affect an oil by washing it with a water solution of suitable substance, as soap, causing the solids to migrate from the oil into the solution, care being taken to employ soap of suitable character whose total amount is sufficient to operate upon the quantity of solids present in the oil and to regulate or control the concentration or dilution of the soap solution.

Referring to Fig. 1, there is shown in chart form an ordinary fractional distillation of petroleum, for example Appalachian crude oil, resulting in various cuts indicated, of which the refining of the wax bearing distillate and oil residue is more or less fully indicated, in which my method of oil washing may be employed to advantage.

Figure 2:
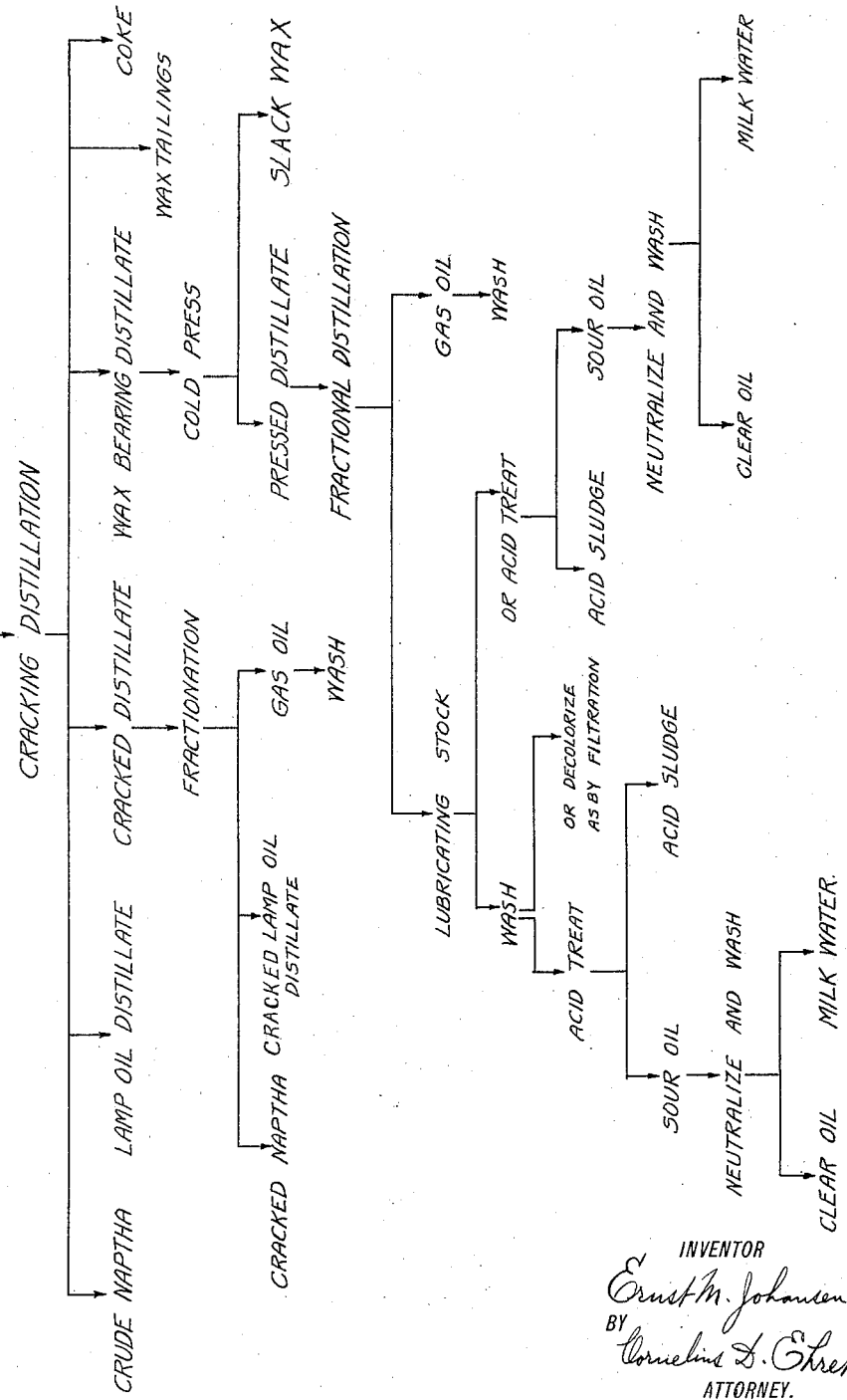

In Fig. 2 there is shown in chart form a possible mode of refining crude petroleum by cracking distillation. In this instance the refining of resulting wax bearing distillate is shown more or less completely, my method of washing an oil being of advantage therein.

In Fig. 3 there is indicated in chart form a possible mode of distillation of crude petroleum, as mid-continent crude, involving topping or production of a reduced crude oil whose refining is indicated more or less completely and in which my method of oil washing is of advantage.

In Figs. 1, 2 and 3 the stage at which my method of washing may be practiced is indicated by the word "Wash." Besides the washing indicated in refining wax bearing distillate, oil residue and reduced crude oil, it will be understood, as indicated in Figs. 1 to 3 inclusive, that gas oil may be washed in accordance with my invention to produce an improved marketable gas or fuel oil product, or which may be subjected to further refinery treatment, as cracking or cracking distillation for producing lighter hydrocarbons, including gasolene, or for any other suitable purposes.

In Fig. 1 the washing will be found, respecting the wax bearing distillate, as an alternative to acid treatment of lubricating stock, washing being resorted to prior to acid treating the oil from which results a sour oil which is neutralized and washed in accordance with my invention. And in the alternative mode of procedure where the lubricating stock is first acid treated, my washing is indicated in connection with neutralization of resultant sour oil.

Respecting the oil residue, Fig. 1, washing may be practiced, as an alternative to acid treating, prior to acid treatment, the sour oil from which may then be neutralized and washed in accordance with my invention. Or where acid treatment of the oil residue is practiced, the sour oil is neutralized and washed.

In the refining method indicated in Fig. 2, my invention may be practiced in connection with the refinement of wax bearing distillate at practically the same stages and in the same ways as indicated in Fig. 1.

In the mode of refining indicated in Fig. 3, the crude petroleum is first topped by subjecting it to steam blown therethrough while heated by fire in a still to remove light hydrocarbons, as gasolene, etc., indicated as crude naphtha. The topped or reduced crude oil is then treated as indicated, and the wax bearing distillate and oil residue, resulting from fractional distillation of the neutralized sour oil, are then treated substantially as indicated in Fig. 1 in connection with the wax bearing distillate and oil residue thereof, my washing process being available as and where indicated.

Among the materials suitable to be used in conjunction with water for washing oils of the character referred to in accordance with my invention, are in general substances which will lower the surface tension of water to suitable extent, such as resinates or resin soaps, soaps of fatty acids, including ordinary domestic or laundry soaps, naphthenic soaps, soaps, including those derived from "milk water," of organic, as sulfonic, acids resulting from treatment of oils by strong or fuming sulphuric acid and found both in the separated sour oil and in the acid sludge; these water soluble soaps are those of the alkali metals and ammonium.

For forming any of the suitable soaps utilized in my method, and especially for forming soaps by reaction with organic acids contained in the oil, there may be employed as suitable reagent sodium, potassium or ammonium hydroxides, or in lieu of hydroxides of these metals, their carbonates, bicarbonates or equivalents may be employed.

In general, the oil to be washed is agitated in any suitable way, as mechanically or by blowing air therethrough, while the same is maintained at suitably high temperature. The temperature of the mixture during treatment is dependent upon the viscosity of the oil, it being understood that an oil of high viscosity will be treated at high temperature. The object is to secure suitable fluidity of the oil and accordingly with higher viscosity higher temperature is employed, somewhat below 212 degrees F. in the cases of oils of very high viscosity. While agitating the oil at suitable temperature water is present or added in sufficient quantity, the matter of dilution in the washing operation being of importance in that there must be present sufficient water to receive from the mixture the soaps and the solid particles or material washed from the oil, and yet the water should not be present in such excess as to reduce the concentration of the soap to such point that it is no longer able suitably to wet the solid particles to be removed from the oil. Nor should the concentration of soap solution be so great as to cause emulsification of the oil which it is desired to wash.

In washing an acid treated oil, particularly for producing non-emulsifying oil, the quantity of soap involved as well as its concentration or the quantity of water involved are of importance in that sufficient soap should be present with regard to the amount of solids or other materials to be washed from the oil, and the quantity of water or dilution is of importance to effect interfacial tension suitable or proper for migration of the solids or other materials from the oil into the water, without permitting the quantities of soap and water in relation to each other to be such as will induce emulsification of too great a part of the oil.

Accordingly it will be understood that by my method or process of oil washing a suitable quantity of soap is necessary, dependent upon the quantity of solids or other material to be removed; that the amount of water or dilution is of importance, and that suitable temperatures and agitation are also desirable.

The treatment or washing of the oil in accordance with my invention may be either before an acid treatment, after acid treatment, or both before and after acid treatment.

As to the washing or treatment of oils which have first undergone so-called acid treatment by strong sulphuric acid, for example, 66 degrees Bé. or stronger, including fuming sulphuric acid, I have found that the sour oil, which is the oil which has been separated from the resulting acid sludge and contains traces of suspended mineral acid and dissolved organic soap-forming acids, may in general contain either too small an amount of organic soap-forming acids, a sufficient amount of such acids or an excess of such acids, the three classes requiring treatment of different characters of treatment.

A suitable mode of determination of the class to which belongs a sour oil is indicated in Fig. 4. The oil, which may be, for example, a lubricating stock, is acid treated and then separated into acid sludge and sour oil. The class to which this sour oil belongs is then determined in the following way. A sample of the sour oil is titrated for acidity caused by both mineral and organic acids. A new sample of the sour oil is then taken and there is added thereto a slight excess of suitable reagent, for example, a slight excess of 4% aqueous solution of caustic soda.

The mixture is agitated while kept at temperature suitable for reduction of the viscosity of the oil, and dilution water added thereto. The agitation, dilution and heating of the mixture is effected in any suitable way, but preferably by passing steam therethrough, as for example, for one-half hour or longer, and until an arbitrary amount of water, including the water containing the reagent, has been added, for example, 30% of the volume of the sour oil. When agitation is discontinued the mixture is a dispersion of oil and water, and the behavior of this dispersion is then observed. It may not separate at all, in which case it is an emulsion which is not miscible with water when added to water, since the water is in the dispersed phase and the oil is the continuous phase. Or it may separate in two characteristic ways, first, into a layer of emulsion whose volume is greater than the volume of the sour oil and which is not miscible with water when added to water, and a lower layer of aqueous solution; or, second, into a lower layer of aqueous solution, a middle layer of emulsion immiscible with water when added thereto, and an upper oily layer, the combined volumes of the emulsion and oil layers being greater than the volume of the sour oil. A dispersion behaving in any one of these three ways indicates that in the sour oil there are not enough soap-forming organic acids to form upon neutralization sufficient soap effectively to wash the oil, by removing therefrom solids or other materials, such as those inducing emulsification, and the oil belongs to class 1.

When the dispersion upon standing separates into sharply defined layers, as milk water or milky aqueous solution, and clear oil, it is known that the sour oil belongs to class 2, namely, one containing sufficient soap-forming acids which when neutralized afford sufficient soap for effectively washing the oil.

The oil belongs to class 3, one having an excess of soap-forming acids therein. if the dispersion fails to separate, it being in such case an emulsion miscible with water when added thereto, or if it separates into a layer of oil whose volume is much less than the volume of the sour oil sample, and into a layer of emulsion miscible with water when added thereto. These emulsions miscible with water when added thereto have the oil dispersed in the continuous phase of water, this being a reversal of phase as compared to the above mentioned emulsions which are not miscible with water when added thereto.

To an oil of class 1, where the soap-forming organic acids in the sour oil are too small in quantity for forming upon neutralization of the sour oil with hydroxide or equivalent solution the requisite amount of soap essential to removal of the amount of solids or removable material present, I add either soap-forming organic acids, either before or after the oil is acid treated, or soaps as such. In adding soap-forming organic acids a sufficient quantity is employed which, with the soap-forming organic acids present in the sour oil, will with the neutralizing solution, as sodium hydroxide or equivalent, form the requisite amount of soaps, the neutralizing solution being added in quantity sufficient to neutralize not only the organic soap-forming acids, but also such mineral acids as may be present. Where soaps are added as such, they are added either before, with or after addition of the neutralizing sodium hydroxide or equivalent in the form of water solutions of the soaps, in which case the added soaps with those produced by neutralizing the organic acids in the sour oil are sufficient to remove the particular quantity of solids present.

The amount of soap-forming organic acids or the amount of soap as such to be added to an oil of class 1 may readily be found by determination of the total quantity of soap necessary suitably to wash the oil. And this total quantity of soap may be determined in any suitable way, one example of which is illustrated by the chart in Fig. 5. Any suitable number of samples of the sour oil, as 5, is taken, and to each sample is added suitable reagent, as aqueous solution of caustic soda or equivalent, in amount slightly in excess of that previously determined by titration as requisite for neutralization of the sour oil. For example, a slight excess of 4% solution of caustic soda may be employed. Through each of the five mixtures is passed steam in the presence of different amounts of soap in the different samples, the agitation being continued a suitable length of time and until an arbitrary dilution, as 30%, is attained. The five samples are then allowed to stand and their behaviors as to separation noted. For example, to the five different samples may be added, respectively, 0.2%, 0.4%, 0.6%, 0.8% and 1% of soap by weight per volume of sour oil, as grams of soap per litre of oil. The separations may be of the character indicated in Fig. 5, from which it will be noted that the samples containing, respectively, 0.2% and 0.4% of soap do not separate into clear oil and milk water, as do the remaining samples. The separation into clear oil and milk water being the deciding factor, it is seen that the sample containing 0.6% of soap is the one so separating and containing the least soap. Accordingly, in treating the oil on a large scale in the plant, its contained acid is neutralized by sodium hydroxide or equivalent and there will be added thereto approximately 0.6% of soap. Or in lieu of adding soap as such, there is added to the oil organic soap-forming acids of quantity sufficient to produce upon neutralization an amount of soap equivalent to the soap added as such.

The extent of dilution or quantity of water to be employed should, however, be determined. This may be accomplished in any suitable way, for example, by the mode of procedure indicated by the chart in Fig. 6. To any suitable number of samples, for example 4, of sour oil is added a slight excess of reagent, for example, a slight excess of 4% aqueous solution of caustic soda. Through each sample is passed steam in the presence of 0.6% to 0.8% of soap, as indicated by the chart of Fig. 5, continuing the agitation until various dilutions ranging, for example, from 30% to 60% for the different samples, are attained. The behavior of the different samples as to separation is then observed. As indicated in Fig. 6, both the samples diluted to 30% and 40% separate into clear oil and milk water. In consequence, 40% is taken as the maximum dilution. The other dilutions of 50% and 60% separate into layers one of which is an emulsion, in addition to the milk water or milky aqueous solution, the formation of emulsion indicating that the 50 and 60% dilutions are excessive. In the case the dilution is too small, as for example using materially less than 30% dilution in the example of Fig. 6, the dispersion separates relatively sharply, but the upper oily layer is generally more or less cloudy.

Accordingly in the plant on large scale the agitation of the oil will be effected at suitable temperature in the presence of say, 40% dilution water. The water containing the necessary reagent, or soap and reagent, is included in the 40% dilution.

When an oil is in class 2, one containing sufficient organic acids to form the suitable or requisite amount of soaps, the washing is effected by agitating the oil at suitable temperature in the presence of aqueous solution of sodium hydroxide or equivalent in amount slightly in excess of that necessary to neutralize the acids present in the oil. But suitable dilution should be observed, and this is determined in any suitable way, as by the method indicated in the chart of Fig. 6.

In the cases of both class 1 and class 2 oils, after they are washed as described, they are allowed to settle, the oil separating as a clear supernatent layer which should be non-emulsifying, since the emulsification-inducing agents have been removed by the treatment. In the lower aqueous layer of the separation will be found variable conditions depending upon the nature of the oil and the nature of its treatment. In general, the lower aqueous solution will be "milk water", an emulsion with water of a small fraction of the oil and the solids removed therefrom while in suspension or in colloidal state, the soaps holding the removed solids and the oil in the state of an emulsion. The emulsion may be broken in any suitable way, as by addition of dilute mineral acid or suitable salt of a mineral acid, whereupon there is a separation of the milk water into layers one of which is the oil with the soaps or soap-forming acids in solution therein, together with the removed solids, and a lower layer of water containing the mineral acid or mineral acid salts. The crude upper or oily layer as such may be used as a soapy or soap-forming material in the oil washing processes herein described; or by removal of the solids a more refined soapy or soap-forming material is available for my oil washing method. From the first mentioned oily layer I have separated the contained solids. They are generally when in the crude state dark bodies of more or less pronounced asphaltic character generally containing some mineral matter, and are believed to be the cause of emulsification of oil containing them.

In the case of an oil falling in class 3, one having therein excessive amount of soap-forming organic acids, sometimes due to large amounts of naphthenic acids present in the original or crude oil, a two-stage washing is resorted to. In the first stage washing, only part of the organic acids are neutralized to form soaps, the mixture being agitated at suitable temperature in the presence of suitable amount of dilution water. This first stage washing removes all or a large part of the solids or other materials into the water, leaving in the oil unneutralized organic acids. In the accompanying milk water from which the oil separates, is an emulsion of a small fraction of the oil and all or a large portion of the solids which it is intended shall be removed together with soap in amount corresponding to the amount of organic acids neutralized. After removing the oil from the aqueous layer or milk water it is subjected to a second stage washing which in general is the same as that for a class 2 oil as above described; namely, a neutralization with sodium hydroxide or equivalent solution of the remaining organic acids which form sufficient soap to remove any solids or other removable materials remaining in the oil. If all the solids are removed in the first stage washing, the second stage washing is merely one of neutralization of the remaining organic acids to form soaps which go into solution in the added water, the mixture separating with a layer of clear non-emulsifying oil.

The determination of the quantity of alkali or reagent to be added to a class 3 oil for the first stage washing or treatment may be by any suitable method, as for example, that indicated by the chart in Fig. 7. To each of any suitable number of samples of the sour oil, for example 3, is added a different quantity of reagent of suitable strength, for example, of 4% aqueous solution of caustic soda, but each of these quantities is less than the quantity of reagent necessary to neutralize the sour oil. Through each sample steam is passed until each has attained a 30% dilution. Upon standing, the behavior of the samples is observed. For example, to the three samples of oil may be added, respectively, 25%, 50% and 75% of the reagent necessary completely to neutralize the acids in the sour oil. As indicated, the samples containing respectively 25% and 50% of the reagent necessary for neutralization, may separate into layers of clear oil and milk water or milky aqueous solutions. These are both suitable or desirable characters of separation, but the 50% addition of reagent is taken as giving the best results, since it is the maximum of the two quantities which will produce a separation of clear oil, leaving less acids to be neutralized in the second stage washing. The sample to which has been added 75% of the quantity of reagent necessary to neutralize it may form an emulsion, and accordingly no separation takes place. This is undesirable, since if the oil be so treated the desired washing is defeated by formation of emulsion.

Having determined the suitable percentage of reagent to be added, the dilution may be determined by any suitable method, for example, that indicated by the chart of Fig. 8. To each of any suitable number of samples of the sour oil, for example 4, is added enough of, say, a 4% caustic soda solution to neutralize 50% of the acids present, this percentage having been determined by the method indicated in Fig. 7. Through each sample is passed steam, continuing to different dilutions for the different samples. The behavior of the samples upon discontinuation of agitation is then observed. When the dispersion separates into a layer of clear oil and a layer of milk water, the dilution is satisfactory, the higher dilution generally being taken. When the mixture separates into an upper layer of oil, an intermediate layer of emulsion and a lower layer of milk water or milky aqueous solution, the dilution has been too great. The dilutions for the different samples may be, for example, as indicated in Fig. 8, respectively, 30%, 40%, 50% and 60%. The highest dilution without production of a layer of emulsion is chosen. In the example illustrated it is a 50% dilution. The dispersion separates into a layer of oil, designated A, and a layer of milk water. The oil A is drawn off from the milk water and is the oil which is then subjected to the second stage washing.

The second stage treatment or washing may be of any suitable character, for example, that indicated in the chart of Fig. 9. A sample of the oil A, Fig. 8, is titrated to determine the amount of hydroxide or equivalent necessary to neutralize the acids remaining therein. This is in effect, however, known, since in the method indicated in Fig. 8 50% only of the acids present in the original oil have been neutralized. This means that the oil A still contains 50% of the original amount of acids. There is then added to the sample an aqueous solution of caustic soda or equivalent, for example, 4% aqueous solution of caustic soda, in amount slightly in excess of that necessary to neutralize the acids remaining in the oil A. Steam is then passed therethrough to agitate the same and to effect a dilution of, say, 30%. The dispersion is then allowed to stand and separates into a layer of milk water or milky aqueous solution, and a supernatent layer of clear non-emulsifying oil.

Obviously, these methods indicated in Figs. 7, 8 and 9 are then readily reproducable in the plant on large batches of class 3 oil.

While the foregoing methods of washing oils of the three classes are available in connection with various mineral oils, acid treated stocks for lubricating oils, from both asphaltic and non-asphaltic crude oils, will be found to fall in any one of the three classes, and so-called steam test or non-emulsifying lubricating oils may be produced by applying the suitable one of the three modes of treatment or washing above described.

Treatment of an acid treated oil as above described improves its sparkle or color and removes odor. When undergoing the so-called carbon test, as usually applied to an oil, and particularly to a lubricating oil, less fixed carbon is found in the oil if treated or washed as above described.

While as to the oils separating from the agitated mixtures in treatment of the three classes of oil as above described their clarity or color may largely be depended upon in making determinations or arriving at desired results, it will be understood that such observations may be supplemented by steam test or other usual tests of the separated clear oils to determine whether or not they are of an emulsifying character; or steam or other tests may be relied on to the exclusion of inspection of clarity or color.

Respecting dilution, it may be stated in general, though without limiting my invention thereto, that it will seldom exceed 70% of the volume of the sour oil, the percentage of dilution water including not only the water added, but in addition, the water containing the reagent.

I have found it of advantage to wash an oil of a character requiring acid treatment or filtration before such acid treatment or filtration by soap or equivalent solution of the general character hereinbefore described.

Such washing before acid treatment may comprise any of the modes of washing the three classes of oils as above described in connection with acid treated oils. Where the oil is in effect a class 1 oil, one having insufficient organic acids to form sufficient soap to accomplish satisfactory washing, suitable quantity of organic acids may be added thereto and then neutralization effected to procure the necessary amount of soap with which it is then washed. Or the oil may belong in class 2, in which case simply neutralization will produce sufficient soap for the washing treatment. And if the oil contains excessive amount of organic soap-forming acids, it may be treated by the double stage washing hereinbefore described, though it will be understood that it will rarely, if ever, happen that an oil which has not been acid treated will fall in class 3.

In general, however, a solution containing sufficient soap and of suitable dilution is agitated with the oil to wash it before acid treatment, or the soap may be formed by neutralization with sodium hydoxide or equivalent of organic acids contained in the oil before acid treatment. In any event, the washing is of the general character described and effects several important advantages. One of these is the fact that materially less of strong sulphuric acid is necessary to acid treat the washed oil, the saving being in some instances as great as 40%; and because less acid is employed in treating the oil, less of the valuable high viscosity constituents of the oil are affected or removed by the acid, with the result that the acid treated oil, after removal of the acid sludge therefrom, will be found to be of materially higher viscosity than if the washing preceding the acid treatment were not resorted to. The oil resulting from neutralization of the sour oil is of better sparkle, transparency or color than in the case where the washing preceding acid treatment is omitted. The quality of the acid sludge resulting from the acid treatment of the oil following the above described washing with soap is improved in the sense that it is softer and more readily or easily handled; and does not enclose or entrap so much of the oil and is more readily broken up or disintegrated for recovery of sulphuric acid, and acid coke from the acid sludge yields sulfonic acids, as of Taveau Patent No. 1,271,387, which are more concentrated or purer than otherwise attainable. The acid sludge settles more readily or rapidly from the acid treated oil than in the case where the step of previous washing is omitted.

A further advantage due to the washing preceding acid treatment is a saving in the volume of the oil treated; as one example, where without previous washing the loss in volume of the oil by acid treatment is about 18%, by previous washing the loss may be reduced to about 11%.

Following the acid treatment of the previously washed oil the sour oil is as usual neutralized with sodium hydroxide or other suitable or equivalent solution; generally speaking, washing of the oil previous to the acid treatment yields a sour oil which will by the usual neutralization with sodium hydroxide or equivalent produce a non-emulsifying oil. In some cases, it may be desirable to add acids or soaps, as in the case of class 1 acid treated oils.

The above broadly described washing of oil before acid treatment, as well as before and after acid treatment, applies also to stocks for producing lubricating oils, from both asphaltic and non-asphaltic crude oils, as indicated in Figs. 1, 2 and 3.

The character of washing or treatment of an oil before it has been acid treated may be determined as in the case of a sour oil as hereinbefore described. If the oil after addition of alkali solution and agitation with steam separates into clear water and clear oil, it indicates that it will not be benefited by or requires no washing.

After an oil has been suitably washed prior to acid treatment by any of the preceding described methods respecting sour oil, the sour oil resulting from its subsequent acid treatment is generally suitably washed if merely neutralized in the usual way, like a class 2 sour oil, and the soaps removed by suitable dilution with agitation at suitable temperature. Though if the sour oil is not in class 2, its class and mode of treatment may be determined as hereinbefore described in connection with sour oils in general.

In practicing my method of washing oils, it will be understood that the samples with which the soap and dilution determinations are made may be extremely small as compared with the batches of oil to be washed in accordance with the determinations of soap and dilution. For example, by my method 1500 barrels of the oil have been washed in a single operation, while as little as 5 litres or less of oil have sufficed for making the soap and dilution determinations.

The predetermination of quantity of soap and degree of dilution are of importance from a refinery standpoint in that attempts to wash large batches of oil by agitation with soap or alkali solution without predetermination of dilution and quantity of soap or alkali solution, frequently will lead to emulsification of either the entire batch or a part thereof, and in consequence will involve delay and expensive further treatment, and in any event will probably result, if the oil is successfully separated from the emulsion, in leaving that oil of an emulsifying character.

For the sake of brevity in the appended claims, "soap" will be understood to be an alkali salt of a fatty acid, resin acid, napthenic acid, sulfonic acid, or other suitable acid as hereinbefore indicated; and "alkali" will be understood to be a hydrate or hydroxide of an alkali metal or of ammonium, or a carbonate or bicarbonate thereof, or equivalent it being understood that water soluble soaps such as contain calcium and iron, etc., are unsuitable for my process.

What I claim is:

1. The method of treating mineral oil, as petroleum or petroleum product, which consists in washing the same with soap solution, separating the washed oil from the accompanying aqueous solution, acid-treating the separated oil, separating the resultant sludge and oil from each other, and thereafter neutralizing said last named oil with an aqueous solution of alkali.

2. The method of treating mineral oil, as petroleum or petroleum product, which consists in washing the same with a solution containing such quantities of soap and water as will wash said oil without substantial emulsification thereof, separating the washed oil from the accompanying aqueous solution, acid treating the separated oil, separating the resultant sludge and oil from each other, and thereafter neutralizing said last named oil with an aqueous solution of alkali.

3. The method of treating mineral oil, as petroleum or petroleum product, which consists in washing the same with a solution consisting of such quantities of soap and water as will remove foreign matter therefrom without substantial emulsification thereof, separating the washed oil from the accompanying aqueous solution, acid treating the separated oil, separating the resultant sludge and oil from each other, and thereafter washing said last named oil in the presence of soap and water in such quantities as prevent emulsification.

4. The method of treating mineral oil, as petroleum or petroleum product, which comprises washing the same with soap solution, separating the washed oil from the accompanying aqueous solution, recovering the soap materials from said aqueous solution, and employing said soap materials for washing mineral oil.

5. The method of treating mineral oil, as petroleum or petroleum product, which comprises adding soap forming acids to said oil, agitating said oil and acids with an aqueous alkaline solution, separating the resulting oil and aqueous emulsion, acidifying said aqueous emulsion, separating the resulting oil and soap forming acids and aqueous solution, and adding the oil and soap forming acids to an oil to be washed.

6. The method of treating mineral oil, as petroleum or petroleum product, which consists in adding soap forming organic acids to said oil, agitating said oil with alkaline solution, separating the resulting aqueous solution and washed oil, treating said oil with acid, separating the resulting sludge and oil, neutralizing said oil with alkaline solution, separating the resulting oil and aqueous solution, acidifying said last named aqueous solution, separating the resulting oil and organic soap forming acids from aqueous solution, and adding said separated oil and acids to mineral oil to be washed.

7. The method of determining whether an oil, as petroleum or petroleum product, contains the correct quantity or more or less of soap forming acids to form with added alkali the quantity of soap suitable for removing from the oil without substantial emulsification thereof its emulsification inducing contents, which consists in adding to said oil alkali solution slightly in excess of said soap forming acid, agitating the mixture, allowing the mixture to stand, and observing whether there is first, a clear separation of oil and aqueous solution, second, no separation or separation into a layer of emulsion and aqueous solution, or separation into layers of oil, emulsion and aqueous solution, the emulsions in each instance being immiscible with water, and third, no separation or separation into layers of oil and emulsion, the emulsion in each instance being miscible with water.

8. The method of determining the dilution of soap solution suitable for removing from oil, as petroleum or petroleum product, its emulsification inducing contents without substantial emulsification of said oil, which consists in providing a suitable quantity of soap in several samples of said oil, adding varying quantities of water to the several samples, agitating said samples, allowing said samples to stand, and observing among the samples the sample or samples in which there is a clear separation of oil and solution.

9. The method which consists in agitating several samples of oil, as petroleum or petroleum product, with varying quantities of soap solution and observing that sample containing the least quantity of soap in which there is a clear separation of oil and aqueous solution, adding this quantity of soap solution to several samples of oil, and agitating said samples with different quantities of water and observing that sample containing the greatest quantity of water, in which there is a clear separation of oil and aqueous solution.

10. The method of determining the proportion of soap to oil, as petroleum or petroleum product, for removing therefrom emulsification inducing contents without substantial emulsification of said oil, which consists in adding different quantities of soap solution to several samples of said oil, agitating said samples, allowing the samples to stand, and observing among the samples in which there is a clear separation of oil and solution that sample to which was added the smallest quantity of soap solution.

11. The method of treating crude petroleum, which consists in topping the same, and washing the resulting reduced crude oil with aqueous soap solution.

12. The method of treating crude petroleum, which consists in steam reducing said crude petroleum, washing and resulting reduced crude oil with aqueous soap solution, and distilling the resulting washed oil.

13. The method of treating reduced crude oil, which consists in washing said oil with aqueous soap solution, acid treating said oil, washing said acid treated oil with an alkaline solution, and subjecting said oil to fractional distillation.

14. The method of treating reduced crude oil, which comprises acid-treating the same, neutralizing the sour oil, distilling the neutralized oil, and washing with soap solution an oil resulting from said distillation.

15. The method of treating reduced crude oil, which comprises acid-treating the same, neutralizing the sour oil, distilling the neutralized oil, washing with soap solution an oil resulting from such distillation, and thereafter acid-treating the same.

16. The method of treating wax bearing oil, which consists in separating the wax from the oil, washing the wax-free oil with soap solution, and thereafter acid-treating the washed wax-free oil.

17. The method of treating mineral oil, as petroleum or petroleum product, which consists in washing the same with soap solution, and thereafter acid-treating the washed oil.

18. The method of treating mineral oil, as petroleum or petroleum product, which comprises washing the oil with soap solution, acid-treating the washed oil, and thereafter washing the acid-treated oil with soap solution.

19. The method of treating mineral oil, as petroleum or petroleum product, which comprises washing the oil with soap solution, acid-treating the washed oil, and neutralizing and washing the resultant sour oil.

20. The method of treating mineral oil, as petroleum or petroleum product, which is substantially free of sulfo-compounds of acid character, which comprises washing the oil with aqueous soap solution of such concentration and quantity as to render the oil non-emulsifying.

21. The method of treating mineral oil, as petroleum or petroleum product, which is substantially free of sulfo-compounds of acid character and which contains organic soap-forming acids insufficient to form sufficient soap for washing the oil, which comprises neutralizing said organic acids while in the oil to form soaps, and thereafter washing the oil with an aqueous soap solution comprising said soaps and additional soap, the concentration and quantity of said soap solution being such as to render the oil non-emulsifying.

22. The method of treating mineral oil, as petroleum or petroleum product, which comprises washing the same with soap solution, thereafter acid-treating the washed oil, and thereafter washing the sour oil with water and soap resulting from neutralization of the organic acids in the sour oil.

23. The method of treating mineral oil, as petroleum or petroleum product, which comprises washing the same with soap solution thereafter acid-treating the washed oil, and thereafter washing the sour oil with water and soap resulting from neutralization of the organic acids in the sour oil and additional soap, the quantities of water and total soap being such as to render the oil non-emulsifying.

In testimony whereof I have hereunto affixed my signature this 8th day of May, 1919.

ERNST M. JOHANSEN.